(12) United States Patent
Endert (10) Patent No.: US 7,947,138 B2
(45) Date of Patent: May 24, 2011

(54) SYSTEMS AND METHODS FOR CREATING TEXTURED LAMINATE PRESS PLATES

(75) Inventor: Martin Endert, Spartanburg, SC (US)

(73) Assignee: Kings Mountain International, Inc, Kings Mountain, NC (US)

( * ) Notice: Subject to any disclaimer, the term of this patent is extended or adjusted under 35 U.S.C. 154(b) by 41 days.

(21) Appl. No.: 11/957,074

(22) Filed: Dec. 14, 2007

(65) Prior Publication Data

US 2009/0151851 A1    Jun. 18, 2009

(51) Int. Cl.
*B32B 38/06*    (2006.01)

(52) U.S. Cl. .......... 156/64; 156/219; 156/220; 156/581; 33/616

(58) Field of Classification Search .......... 156/230–240, 156/307.4; 264/219–227, 40.1–40.7; 700/98, 700/124, 125; 33/616
See application file for complete search history.

(56) References Cited

U.S. PATENT DOCUMENTS

| | | | | |
|---|---|---|---|---|
| 1,477,392 A | * | 12/1923 | Smith ......................... 101/474 |
| 2,390,618 A | * | 12/1945 | Roehm ......................... 101/32 |
| 2,444,863 A | | 7/1948 | Tornberg | |
| 2,783,172 A | | 2/1957 | Avery | |
| 2,894,454 A | | 7/1959 | Hillier | |
| 3,487,133 A | * | 12/1969 | Lindsay ....................... 264/40.1 |
| 4,062,992 A | | 12/1977 | Power et al. | |
| 4,421,026 A | * | 12/1983 | McCullion, Jr. ............. 101/136 |
| 4,425,417 A | * | 1/1984 | Ingalls et al. .................. 430/30 |
| 5,723,221 A | | 3/1998 | Brooker | |
| 5,744,081 A | * | 4/1998 | Tanigawa et al. ............. 264/219 |
| 6,638,387 B2 | * | 10/2003 | Cruz ............................. 156/219 |
| 7,249,445 B2 | | 7/2007 | Thiers | |
| 2002/0160680 A1 | | 10/2002 | Laurence | |
| 2003/0050163 A1 | | 3/2003 | Smith | |
| 2003/0108717 A1 | | 6/2003 | Sjoberg | |
| 2007/0079925 A1 | | 4/2007 | Hansson et al. | |

FOREIGN PATENT DOCUMENTS

| | | |
|---|---|---|
| DE | 39 17 919 A1 | 12/1989 |
| DE | 10 2005 020 456 A1 | 11/2006 |
| EP | 0 172 947 A1 | 3/1986 |
| EP | 1 153 736 A1 | 11/2001 |
| EP | 1 595 718 A1 | 11/2005 |

(Continued)

OTHER PUBLICATIONS

European Search Report for Application No. 08021355.6-2304, search completed Mar. 26, 2009.

(Continued)

*Primary Examiner* — Philip C Tucker
*Assistant Examiner* — William P Bell
(74) *Attorney, Agent, or Firm* — Moore & Van Allen PLLC; Christopher W. McAvoy; Ryan P. Harris (57) ABSTRACT

Embodiments of the present invention provide systems and methods for creating textured laminate press plates that account for growth of the press plate and growth of the laminate's decorative layer. More particularly, embodiments of the present invention involve printing a two-dimensional representation of the three-dimensional surface of the proposed press plate, assuming a certain amount of expansion, onto a transparent overlay, such as a cellulose acetate sheet or a plate of glass. Embodiments of the present invention further involve positioning the overlay over an un-textured sample decorative laminate to examine the alignment of the press plate's proposed texture design with the sample laminate's decorative design.

16 Claims, 4 Drawing Sheets

FOREIGN PATENT DOCUMENTS

| | | |
|---|---|---|
| GB | 2 047 625 A | 12/1980 |
| JP | 08039669 A * | 2/1996 |
| WO | WO 02/058924 A1 | 8/2002 |
| WO | WO 2006136949 A2 * | 12/2006 |

OTHER PUBLICATIONS

European Search Report for Application No. 08021354.9-2304, search completed Mar. 27, 2009.

* cited by examiner

SYSTEMS AND METHODS FOR CREATING TEXTURED LAMINATE PRESS PLATES

FIELD

The invention generally relates to the field of textured decorative laminates, and more particularly, embodiments of the present invention relate to systems and methods for creating textured laminate press plates and for accounting for press plate growth and laminate growth in the press plate design.

BACKGROUND

Decorative laminates have been used as surfacing material for many years, in both commercial and residential applications. Decorative laminates can provide an aesthetically pleasing surface that is more economical and/or has improved physical characteristics compared to similar looking alternatives. For example, decorative laminates can be used to create flooring that has the appearance of real hardwood flooring but is less expensive and more durable than real hardwood flooring.

In addition to flooring, decorative laminates are often used in furniture, countertops, cabinets, wall paneling, partitions, fixtures, and the like. As described above, decorative laminates can be made to resemble real wood. Decorative laminates can also be made to resemble such other materials and surfaces as stone, ceramic, marble, concrete, leather, fabric, brick, tile, and the like. In other applications, instead of being made to resemble a particular traditional material or surface, a decorative laminate may be made to provide more fanciful surfaces.

More recently, decorative laminates have been improved to include a three-dimensional "textured" surface. In this way, decorative laminates can be made to not only look like some other material or surface, but can also can be made to feel like the other material or surface. In fact, decorative laminates can be made to so closely resemble the look and feel of other materials that one cannot easily determine whether the surface includes the real materials or is a faux representation of the real materials. For example, a textured decorative laminate made to look like real wood paneling may include a plurality of depressions and/or protrusions on its surface to create a texture that simulates the grains and knots of real wood boards. In another example, the textured decorative laminate may be made to look like a plurality of ceramic tiles separated by grout lines. In such an embodiment, the surface of the laminate may be made so that the images of the grout lines are depressed relative to the images of the ceramic tiles. In still other applications, textured decorative laminates may be made with more fanciful visual artwork and may have embossing and textures that work in conjunction with the visual artwork to create a more interesting and aesthetically pleasing surface.

In general, decorative laminates are classified into two broad categories based on how the laminates are manufactured, namely "high" pressure decorative laminates (HPDLs) and "low" pressure decorative laminates (LPDLs). In general, the industry considers "high" pressure decorative laminates as those laminates that are manufactured or "laminated" under a pressure of generally more than 750 psig. "Low" pressure decorative laminates are typically manufactured at a pressure of about 300 to 600 psig.

HPDLs and LPDLs are often further distinguished by the fact that HPDLs are typically manufactured by first laminating a decorative paper layer with one or more other thin layers and a resin to create a relatively thin and flexible laminate. This thin and flexible laminate is then typically adhered to a thicker, self-supporting substrate layer during a later stage of manufacturing. In contrast, LPDLs are typically manufactured by laminating the decorative paper layer with the self-supporting substrate layer, such as particleboard or MDF, and a resin in a single laminating or "pressing" operation during its manufacture. Generally, the idea is that the higher pressures involved in manufacturing HPDLs may "crush" the substrate layer. For this reason, LPDLs are sometimes also referred to as "direct" pressure decorative laminates (DPDLs) since the decorative layer is laminated or "pressed" directly onto the core layer in a single step. However, it should be noted that, although manufacturing HPDLs typically involves the two steps described above while manufacturing LPDLs typically involves the one step described above, this is merely a generalization about the typical manufacturing processes used to make the two different types of laminates. In some procedures, an HPDL may be laminated with a self-supporting substrate layer in a single pressing step and a LPDL may be adhered to a substrate layer in more then one step.

Figure 1:
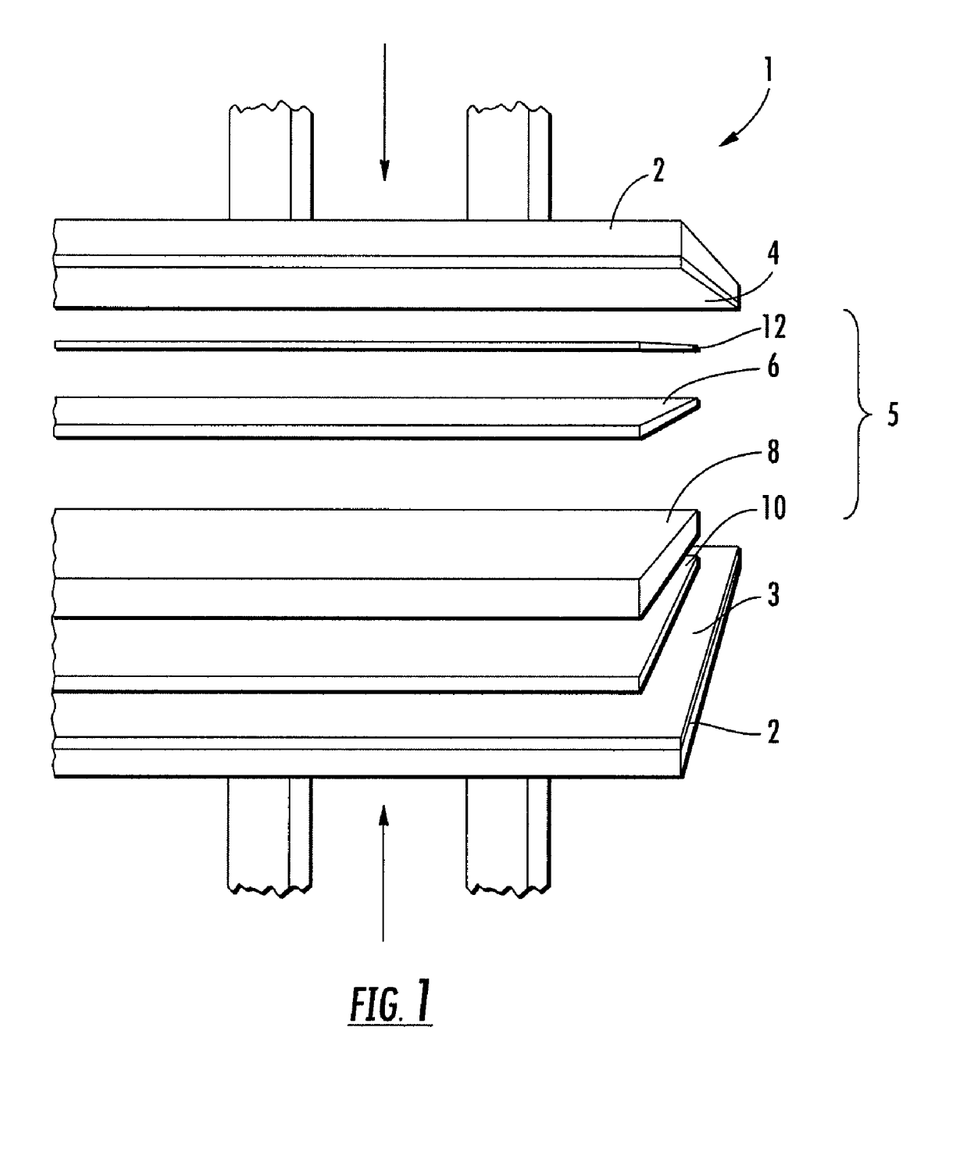
FIG. 1 illustrates an exemplary low pressure decorative laminate and a low pressure press system, such as one that may be used in accordance with embodiments of the present invention.

FIG. 1 illustrates an exemplary LPDL 5 and press system 1, such as one that may be used in accordance with embodiments of the present invention. As illustrated in FIG. 1, the laminate 5 generally comprises a decorative layer 6 and a substrate layer 8. The decorative layer 6 is typically a sheet of paper or similar material having a decorative image or pattern printed thereon. The substrate layer 8 is used to provide structure to the laminate and may be, for example, particleboard, high-density fiberboard (HDF), medium-density fiberboard (MDF), or the like. The decorative layer 6 is soaked with resin, such as a melamine formaldehyde resin, and is bonded to the substrate layer 8. In some embodiments, one or more other layers are bonded with the decorative layer 6 and the substrate layer 8. For example, a substantially transparent wear resistant layer 12 may be bonded over top of the decorative layer 6 to protect the "top" surface of the final laminate. Likewise, a base layer 10 may be bonded to the lower surface of the substrate to protect the "bottom" surface of the final laminate.

As illustrated in FIG. 1, these layers are at least partially coated or saturated with resin and placed in a press 2 where they are bonded together under heat and pressure. For example, the layers are typically heated to approximately 160 to 220 degrees Celsius and pressed together at approximately 300 to 400 psi for approximately 15 to 20 seconds. The heat cures the thermosetting resin, thereby bonding the layers together. For textured decorative laminates, the upper portion of the press 2 typically has a press plate 4 attached thereto, where the press plate 4 has a plurality of depressions and/or protrusions arranged in a three-dimensional design. When the press plate 4 is pressed into the resin and against the upper surface of the laminate, the resin on the upper surface cures with an imprint of the three-dimensional surface of the press plate therein. The press 2 may also include a lower press plate 3 attached thereto. The lower press plate 3 may have a flat, smooth surface or, in some embodiments, may have a plurality of depressions and/or protrusions arranged in a three-dimensional design so that the lower surface of the laminate is embossed in addition to or as an alternative to the upper surface of the laminate.

Importantly, the textured press plate 4 must be aligned precisely with the decorative layer 6 so that the texture design pressed into the laminate is properly aligned with the decorative image or pattern on the decorative layer 6. If the press plate 4 is even slightly out of register with the decorative layer 6, the resulting laminate may have to be discarded. For example, if the texture pattern is slightly shifted or angled relative to the decorative pattern, a moiré effect can be created resulting in a significantly blurred image or the appearance of undesirable patterns in the laminate. In another example, a feature of the texture design is obviously misaligned with some corresponding feature of the decorative image. For instance, where the decorative image is of a tiled surface, a ridge that is intended to be aligned with the edge of a tile in the decorative image may instead fall in the grout line area or the tile area of the decorative image.

The registration of the press plate and the decorative layer is further complicated by the fact that the metallic press plate expands when heated during the laminating process and the fact that the decorative layer and the substrate layer may also expand based on the specific material properties of each layer. Furthermore, each press may uniquely effect how a press plate will grow based on how the particular press fixes the press plate to the press, e.g., based on the position and spacing of lugs and/or clamps used to secure the press plate to the press.

A system for generating HPDLs may, in some cases, be similar to the LPDL system shown in FIG. 1. The pressures, and often temperatures, however, will generally be significantly higher in an HPDL system. Although the layering in an HPDL may be different, the manufacture of textured HPDLs still generally involves use of a press, a textured press plate, a decorative layer, and a thermosetting polymeric resin.

Typically, the party that manufactures the laminate has another party create the textured press plate(s) used in the manufacturing process. Since the press plates must be able to withstand significant and repetitive heat and pressure changes and since the press plates must typically have very detailed and precise texture patterns formed of many minuscule depressions and/or ridges in the press plate, the manufacturer of the press plate is typically a company that specializes in the manufacture of precision metal plates. Although the laminate maker, and perhaps the end user of the laminate, generally decide on what will be a suitable texture for the resulting laminate, the press plate manufacturer is also usually involved in the design of the texture since the press plate company typically has significant knowledge of which textures are possible and at what cost different textures can be made. As such, the laminate designer typically must work closely with the press plate manufacturer in order to obtain the desired look and feel of the finished laminate and to determine allowable tolerances in the registration of the press plate and the decorative layer.

Since the process is usually an iterative one, there needs to be fast and economical ways for the different parties to communicate ideas to one another and to determine how the finished product will appear without having to make full scale press plates and laminates each time a change is made or another idea is tried during the design process. There also needs to be systems and methods to allow a press plate manufacturer to account for growth of the press plate and of the laminate layers during the design of the press plate.

BRIEF SUMMARY OF EMBODIMENTS OF THE INVENTION

Embodiments of the present invention provide systems and methods for creating textured laminate press plates that account for growth of the press plate and growth of the laminate's decorative layer. More particularly, embodiments of the present invention involve printing a two-dimensional representation of the three-dimensional surface of the proposed press plate, assuming a certain amount of expansion, onto a transparent overlay, such as a cellulose acetate sheet or a plate of glass. Embodiments of the present invention further involve positioning the overlay over an un-textured sample laminate to examine the alignment of the press plate's proposed texture design with the sample laminate's decorative design.

More particularly, embodiments of the present invention provide a method of creating a press plate. The method generally includes: (i) providing a three-dimensional surface design for the press plate; (ii) providing a sample decorative layer comprising a decorative design printed thereon; (iii) providing a transparent overlay having a two-dimensional representation of the three-dimensional surface design printed thereon; and (iv) positioning the transparent overlay with the two-dimensional representation of the three-dimensional surface design printed thereon over the sample decorative layer to view the three-dimensional surface design in relation to the decorative design.

In one embodiment of the method, providing a transparent overlay having a two-dimensional representation of the three-dimensional surface design printed thereon involves printing the two-dimensional representation of the three-dimensional surface design onto the transparent overlay. In some embodiments, providing a three-dimensional surface design for the press plate involves creating a three-dimensional surface design digitally based on a digital image of the decorative design.

In an exemplary embodiment, providing a sample decorative layer involves providing a sample decorative laminate comprising the sample decorative layer laminated therein. In such an embodiment, providing a sample decorative laminate may involve manufacturing a sample decorative laminate using substantially the same materials and procedures that will be used to create a final decorative laminate. The method may also include measuring differences between the decorative design on the sample decorative laminate and a copy of the decorative design that has not undergone a laminating procedure. The method may further involve revising the three-dimensional surface design based on the measured differences between the decorative design on the sample decorative laminate and a copy of the decorative design that has not undergone a laminating procedure, and the two-dimensional representation may be a representation of the three-dimensional surface design after having been revised based on the measured differences.

In some embodiments the method also involves providing a digital image of the decorative design, and obtaining measurements of the differences between the digital image of the decorative design and the decorative design printed on the sample decorative layer. Such an embodiment may further involve using the measurements to adjust the three-dimensional surface design for the press plate.

The method may, in some embodiments, include determining how much the press plate will expand during the laminating process, and then scaling the three-dimensional surface design for the press plate based on how much the press plate will expand during the laminating process. In the method, the step of positioning the transparent overlay with the two-dimensional representation of the three-dimensional surface design printed thereon over the sample decorative layer may further include the step of aligning registration marks printed on the transparent overlay with registration marks printed on the sample decorative layer.

In some embodiment, the transparent overlay comprises an acetate sheet, and the sample decorative layer comprises a paper sheet. In some embodiments, the decorative design comprises an image of a wood, ceramic, tile, stone, or brick surface, and the three-dimensional surface design for the press plate is configured to create a texture indicative of the wood, ceramic, tile, stone, or brick surface in the surface of a laminate created using the press plate.

Embodiments of the present invention also provide a system for checking the design of a proposed press plate. The system generally includes a transparent overlay having a two-dimensional representation of the press plate's proposed three-dimensional surface printed thereon. In some embodiments, the two-dimensional representation of the press plate's proposed three-dimensional surface accounts for growth in the proposed press plate and in a decorative layer of a proposed laminate that will occur when manufacturing the proposed laminate.

For example, in some embodiments the system includes a digital representation of the press plate's proposed three-dimensional surface. The two-dimensional representation of the proposed three-dimensional surface may be based on the digital representation of the press plate's proposed three-dimensional surface, and the two-dimensional representation printed on the transparent overlay may be dilated relative to the press plate's proposed three-dimensional surface to account for growth that the press plate will undergo during a laminating procedure.

In some embodiments, the system includes a sample decorative laminate having a decorative layer laminated to at least one other layer, where the decorative layer comprises a decorative design printed thereon. In such an embodiment, the transparent overlay is configured such that it can be positioned over the sample decorative laminate so that the two-dimensional representation of the press plate's proposed three-dimensional surface can be viewed in relation to the decorative design. The sample decorative laminate and the transparent overlay each may have one or more registration marks that assist with registration of the transparent overlay with the decorative layer.

In some embodiments of the system, the transparent overlay comprises an acetate sheet, a glass plate, a polymeric sheet, or a polymeric plate. In some embodiments, the two-dimensional representation of the press plate's proposed three-dimensional surface is printed onto the transparent overlay using different colors or different shades of color to represent different features of the proposed three-dimensional surface, such as elevation of the embossing and/or other variations in texture.

Embodiments of the present invention further provide a method involving the following steps: (i) providing an image of a decorative design; (ii) providing a sample laminate comprising a decorative layer having the decorative design printed thereon; (iii) measuring variations between the image of the decorative design and the decorative design on the sample laminate; (iv) creating or adjusting a three-dimensional surface design for a press plate based upon the image of the decorative design and the measured variations between the image of the decorative design and the decorative design on the sample laminate; (v) providing a transparent overlay having a two-dimensional representation of the three-dimensional surface design printed thereon; (vi) positioning the transparent overlay with the two-dimensional representation of the three-dimensional surface design printed thereon over the sample laminate to view the two-dimensional representation of the three-dimensional surface design in relation to the sample laminate's decorative design; and (vii) creating the press plate where the three-dimensional surface of the press plate is created based on the three-dimensional surface design and is smaller than the two-dimensional representation of the three-dimensional surface design printed on the transparent overlay to account for growth that the press plate will undergo when subject to heat during a laminating procedure.

BRIEF DESCRIPTION OF THE SEVERAL VIEWS OF THE DRAWINGS

Having thus described embodiments of the invention in general terms, reference will now be made to the accompanying drawings, which are not necessarily draw to scale, and wherein:

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Although the background section refers primarily to low pressure laminates, embodiments of the present invention may be used during the creation of press plates for low pressure laminates, high pressure laminates, and/or other laminates. Furthermore, although embodiments of the present invention are generally described herein as being used to create press plates and texture designs for an "upper" surface of a laminate, embodiments of the present invention can be similarly used to create press plates and texture designs for the "lower" surface of a laminate or any other surface of a laminate, as will be apparent to one of ordinary skill in the art in view of this disclosure. Likewise, the press plates described herein may be installed in a press as "upper" press plates, "lower" press plates, and/or any other type of press plates, as will be apparent to one of ordinary skill in the art in view of this disclosure.

Figure 2:
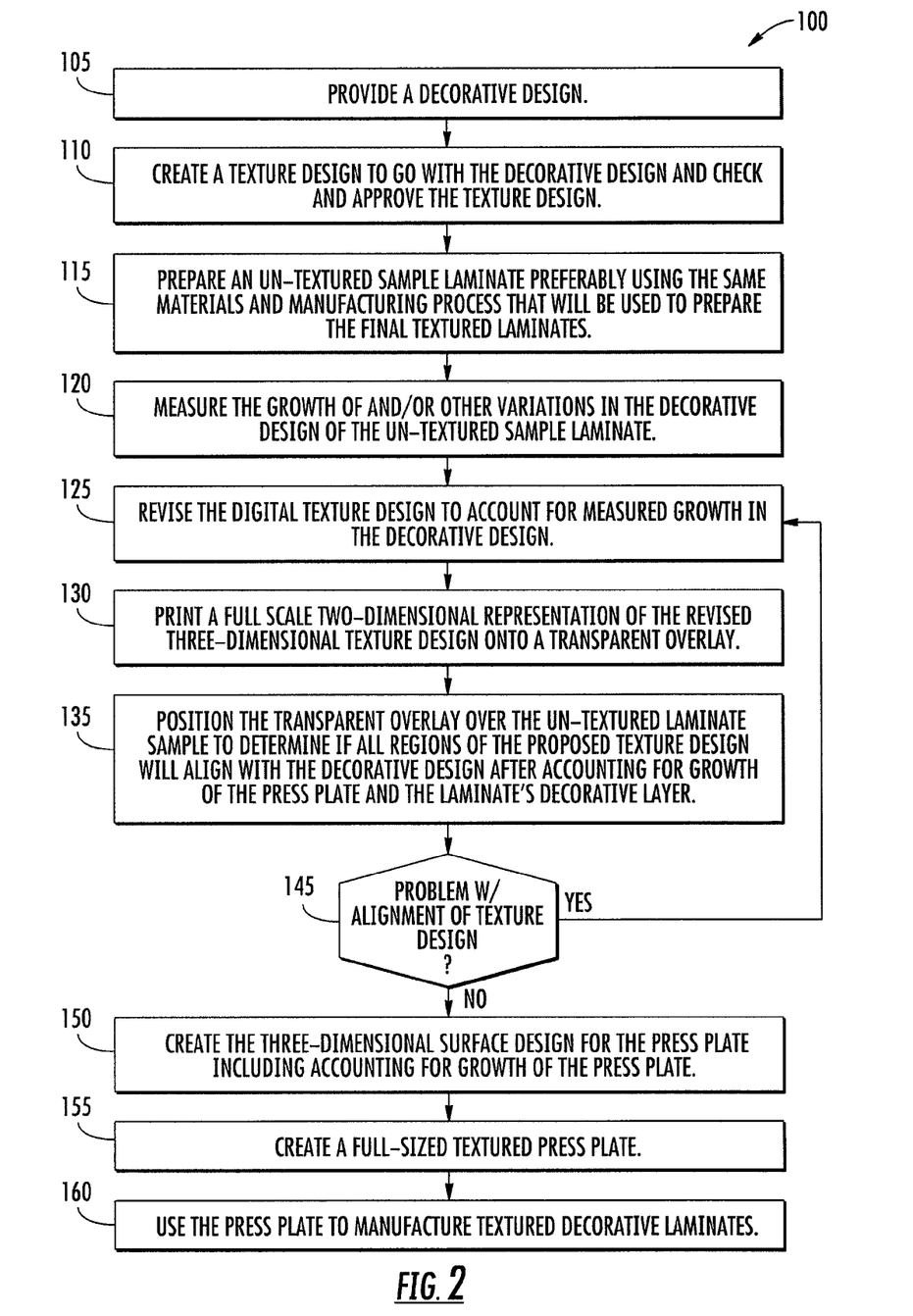
FIG. 2 is a flow chart illustrating a press plate design process, in accordance with an exemplary embodiment of the present invention.

Referring now to the figures, FIG. 2 provides a flow chart illustrating a press plate design process 100, in accordance with an exemplary embodiment of the present invention. As illustrated by blocks 105 and 110, respectively, a decorative design is provided and a texture design is created to go along with the decorative design. The decorative design determines the general appearance of the laminate and, therefore, generally comprises an aesthetically pleasing image. As described above, the decorative design may, for example, comprise an image that has the appearance of wood flooring, a tiled surface, marble, granite, concrete, brick, leather, fabric, and the like.

The "texture design" comprises the three-dimensional design of the proposed surface of the laminate. As used herein the term "texture" is generally used to refer to three-dimensional surface formations that may include various surface textures, depressions, protrusions, ridges, troughs, other embossed features, and the like. The texture design is generally configured to work with the decorative design to create a surface that closely resembles the look and/or feel of the surface or material that the laminate is intended to resemble. For example, where the decorative design comprises an image having the appearance of hardwood flooring, the texture design may comprise a plurality of depressions and/or ridges in the surface of the laminate that simulate the appearance and/or feel of wood grain and/or other features of real wood boards. In general, the texture design will ultimately be used to create a three-dimensional surface of a press plate, which will generally be the negative of the texture design.

Figure 3:
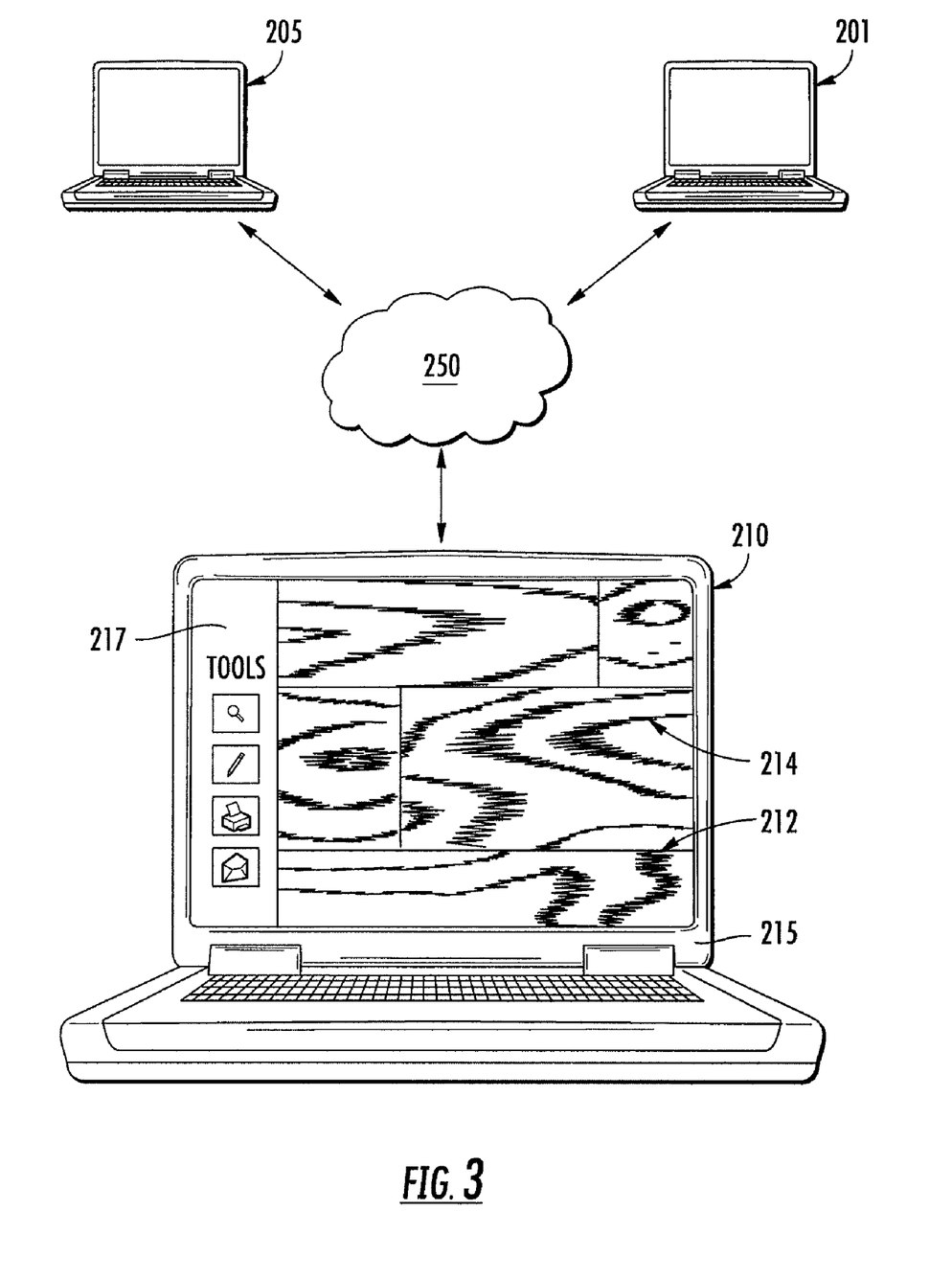
FIG. 3 illustrates using computer software and hardware to create a texture design digitally, in accordance with an exemplary embodiment of the present invention.

FIG. 3 illustrates how the decorative design may be provided and the texture design may be created in accordance with an exemplary embodiment of the present invention. As illustrated in FIG. 3, the process may, in some instances, involve three parties, namely the party requiring the laminate 205, the laminate manufacturer 201, and the press plate manufacturer 210. In one embodiment, the laminate manufacturer 201 provides the decorative design to the press plate manufacturer 210 along with at least loose guidelines as to what the laminate manufacture 201 or the party requiring the laminate 205 desires with regard to the laminate's surface texture. In this regard, the laminate manufacturer 201 may, for example, communicate a digital image of the decorative design to the press plate manufacturer 210 via a network 250. This digital image provided to the press plate manufacturer 210 is preferably the same digital image that the laminate manufacturer will print on the decorative paper used in the laminate.

Once the press plate manufacturer 210 receives the digital image of the decorative design and any texture guidelines provided by the laminate manufacture 201 and/or the party requiring the laminate 205, the press plate manufacturer 210 may then use computer software and hardware to view the digital image of the decorative design and to digitally generate a three-dimensional texture design to go along with the decorative design. For example, as illustrated in FIG. 3, the computer software 217 may permit the press plate manufacturer 210 to view the decorative design 212 on a computer monitor 215 and may have a variety of tools 217 that allows the press plate manufacturer 210 to generate and view the texture design 214 over top of the image of the decorative design 212.

Typically, creation of the texture design requires significant experience and knowledge of not only the surface or material that the laminate will emulate, but also of human perception. For example, since the design and manufacturing constraints (such as the maximum possible embossing depth) may limit the texture design, the artist creating the texture design must know how to create a natural looking surface despite the fact that it may not be possible to exactly replicate the actual three-dimensional surface of the material or surface being emulated. Furthermore, the human mind may have expectations as to how a natural surface should look and feel that are not always accurate. The artist creating the texture design may also have numerous variables to work with, such as the depth/height of embossed features, different surface textures, the gradualness/sharpness of transitions between features, the fineness and detail of the design, and the like. For all these reasons, a natural looking laminate typically does not exactly replicate the surface of the material the laminate is emulating.

As further illustrated by block 110 of FIG. 2, once the texture design is created, the texture design may need to be checked and approved, by for example the laminate manufacturer 201 and/or the party requiring the laminate 205. Co-pending U.S. patent application Ser. No. 11/957,094, assigned to the same assignee as the present application, describes systems and methods for viewing and checking the proposed texture design and for creating sample textured decorative laminates. This co-pending patent application is incorporated herein by reference.

As illustrated by blocks 115 and 120, an un-textured sample laminate is prepared, typically by the laminate manufacturer, and the decorative design on the sample laminate is measured to determine any positive or negative growth of the decorative layer relative to the original decorative design (e.g., the original digital image of the decorative design). Due to the fact that the decorative layer is generally made of paper that is impregnated with a thermosetting resin and then exposed to significant heat, the decorative layer often becomes somewhat distorted or otherwise modified, experiencing positive and/or negative growth in regions of the decorative layer. These, albeit usually subtle, changes in the decorative layer and the decorative design printed thereon can shift portions of the decorative layer relative to the texture design imprinted in the laminate by the press plate to the point that the laminate's final appearance is significantly degraded. Therefore, by manufacturing a sample laminate prior to making the press plate and by measuring the differences in the sample laminate's decorative design compared to the original decorative design, the press plate design can be modified to account for growth or other changes in the decorative layer.

To accurately determine how the decorative design will likely change between the time it is printed onto the decorative layer and the time that the decorative layer is pressed by the press plate, it is preferable that the un-textured sample laminate be manufactured using the same procedure and the same materials as will be used to manufacture the entire batch of laminates. For example, it is preferable that the paper used to manufacture the sample laminate comes from the same paper manufacturer as the paper that will be used to produce the final laminates. It is even more preferable that the paper used to create the sample come from the same batch of paper and even from the same location on the manufacturing spool as the paper used in the final laminates so that the materials and fiber orientation are substantially uniform from paper sheet to paper sheet in the batch of final laminates. It is also preferable that the paper used in the sample be stored in the same way as the paper that will be used to make the final laminates. The resin used to manufacture the sample laminate should, preferably, also be from the same batch of resin that will be used to create the final laminates.

Furthermore, the process and machinery used to create the sample laminate should be identical to the process and machinery used to create the final laminates (other than maybe the fact that the final laminates will be embossed). For example, the resin impregnation process should be carefully controlled such that each decorative layer is uniformly coated and such that the paper homogeneously absorbs the resin. Any tension applied to the paper during the process, such as forces pulling the paper from a roll and through the press, are also preferably kept as uniform as possible.

As illustrated by block 125, the measurements taken in step 120 are used to revise the texture design to account for growth and/or other variations in the decorative layer that are likely to be repeated in the final laminates. For example, where the texture design is stored digitally, the digital coordinates may be translated based on the measurements to create a revised digital texture design.

Figure 4:
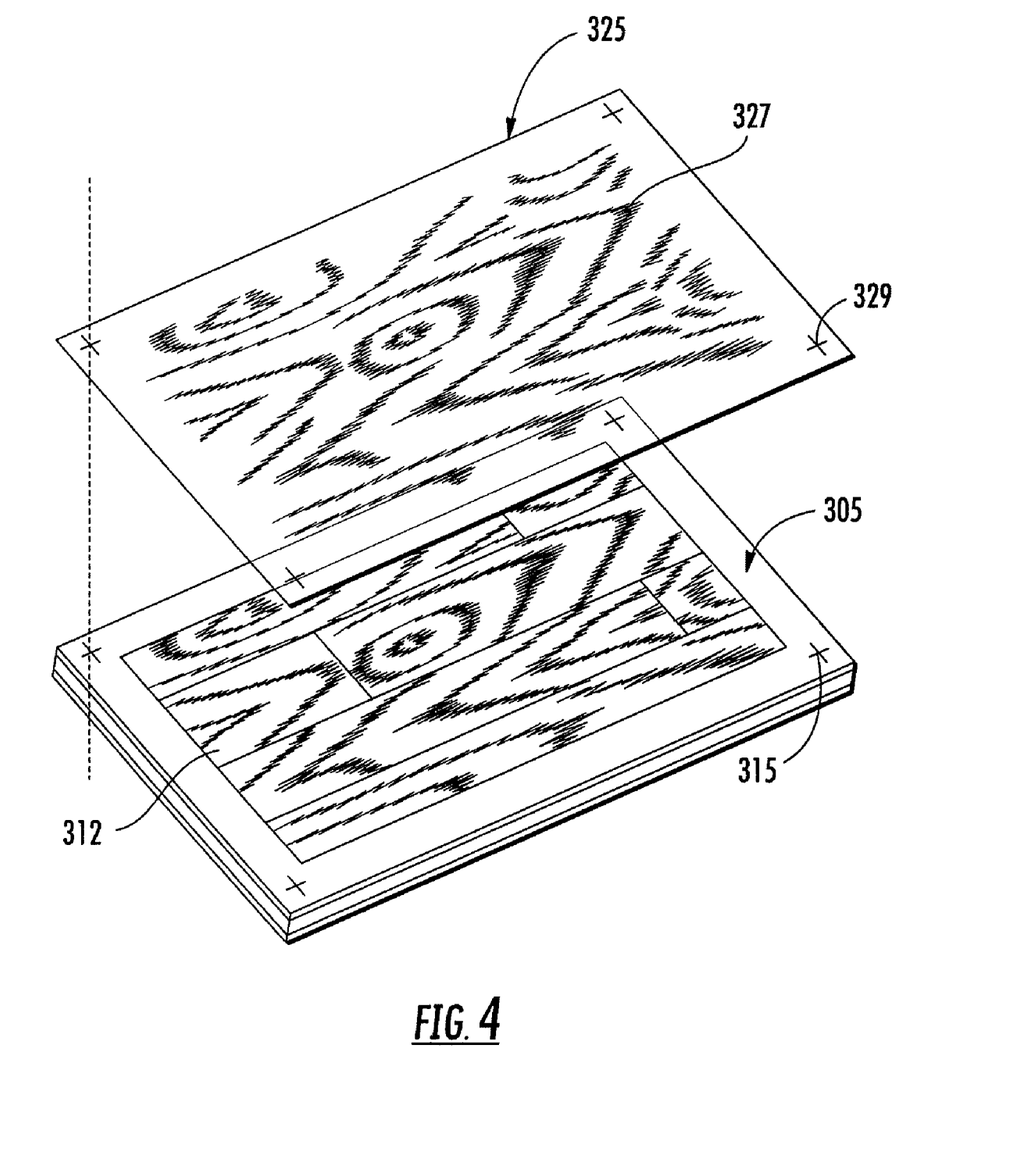
FIG. 4 illustrates using a transparent overlay and sample laminate layers to determine how well a proposed press plate design will align with the laminate's decorative design after accounting for growth in the press plate and in the laminate's decorative layer.

As described in block 130 and as illustrated in FIG. 4, a two-dimensional representation 327 of the revised texture design is then printed onto a transparent overlay 325, such as a cellulose acetate film, a glass plate, a polymeric sheet or plate, or the like. As used herein, the phrase "transparent overlay" includes transparent, semi-transparent, translucent, and other substantially or generally transparent sheets, films, plates, and the like. In this way a transparent "press plate" of sorts is generated that basically shows, in two-dimensional form, how the press plate, expanded due to the heat of the laminating procedure, will look when it is about to engage the surface of the laminate during the laminating procedure. In addition to being generally transparent, the overlay is also preferably made of a material that holds its shape well in terms of the length and width of overlay, such as an acetate film.

As described in block 135 and as also illustrated in FIG. 4, the transparent overlay 325 is then positioned over the untextured sample laminate 305 to determine if all of the regions of the proposed texture design will align with the sample laminate's decorative design 312 after accounting for growth in the laminate's decorative layer and in the press plate. As illustrated in FIG. 4, in some embodiments one or more registrations marks, such as crosshairs 329 and 315, are printed onto the transparent overlay 325 and the sample laminate 305, respectively, to assist with aligning the two-dimensional representation 327 of the texture design with the decorative design 312.

In order to help distinguish features of the texture design, in some embodiments the two-dimensional representation 327 of the texture design printed on the transparent sheet 325 is printed using different colors or shades of color that identify different features of the texture design. For example, since the transparent sheet 325 must provide a two-dimensional representation of a three-dimensional surface design, certain features of the texture design may not be easily visible using a single color. In this regard, different colors and/or shades of color may indicate variations in the third un-represented dimension of the texture design, such as elevation changes in the three-dimensional texture design. For example, the two-dimensional representation of the texture design may be printed onto the transparent sheet in blue, and increasingly darker shades of blue may be used for increasingly deeper depressions in the proposed three-dimensional surface (note that depressions in the laminate surface correspond to protrusions in the press plate, and vice versa).

In another exemplary embodiment, different colors and/or shades of color printed on the transparent sheet may indicate areas in the texture design where different textures are used, since, in some embodiments, different surface textures may be used at different places in the texture design. Such variations in texture may not be easily viewable in a two-dimensional print-out. For example, as described above, a laminate may be designed so that it will have an appearance of a tiled surface having smooth ceramic tiles separated by grout lines. In such an embodiment, in addition to depressing the laminate surface where there are grout line images relative to the elevation of the laminate surface where there are tile images, it may also be desirable for the laminate surface to have a rough texture where there are grout line images and a smoother texture where there are tile images. Minor variations in the surface roughness may not be visible in a two-dimensional printout of the surface, but can be identified using different colors and/or shades of color in a two-dimensional printout.

As illustrated by block 145 in FIG. 2, if, after positioning the transparent overlay 325 over the sample laminate 305, it is seen that there is a problem with the alignment of some aspect of the texture design with the sample's decorative design, the digital texture design is revised accordingly. Steps 130 and 135 may then be repeated to check the revised texture design. However, if the two-dimensional representation 327 of the texture design aligns with the sample's decorative design 312 within certain allowable machine and quality tolerances, then the texture design can be approved and used to manufacture a steel press plate.

The three-dimensional surface of the press plate is generally the negative of the texture design since the press plate is used to form an imprint of its three-dimensional surface into the surface of the laminate. However, as illustrated by block 150 of FIG. 2, before the three-dimensional surface of the press plate can be created from the texture design, the growth of the press plate has to be accounted for. As described above, since the laminating process is performed under significantly high temperatures, the press plate, typically made of a metallic material, experiences significant growth in all dimensions. If the press plate's material is known and uniformity of the press plate's material is controlled, the growth of the press plate in each dimension can usually be computed at least fairly accurately based on known material characteristics and the temperature of the laminating procedure.

However, in some instances, the growth of the press plate during the laminating process is uniquely impacted by the design of the particular press to which the press plate is attached. For example, different press plates may secure a press plate thereto in different ways. In general, low pressure press plates utilize lugs and clamps to secure a press plate to the press and to pull the press plate tight on the press. The number, position, spacing, and type of clamps, lugs, or other securing devices will typically have an effect on the growth of the press plate when the press plate is heated. Therefore, each press may have a unique growth "footprint" based on how the press secures the press plate thereto. In embodiments of the present invention, this growth footprint may be measured before going through the expense of creating the proposed metallic press plate, and this growth footprint can then be accounted for when generating the transparent "press plate," which simulates the growth.

Once the expected growth of the press plate is determined, the proposed texture design (or the negative of the proposed texture design) is then scaled down to allow for the expected growth of the press plate during the laminating procedure. The scaled down texture design (or negative thereof) is then used to create the three-dimensional surface of the press plate, as illustrated by block 155 in FIG. 2. This press plate may then be used by, for example, the laminate manufacturer to manufacture textured decorative laminates.

The press plate is typically made of a metallic material, such as stainless steel. More particularly, the press plate may be comprised of, for example, 630 or 410-grade hardened stainless steel. In general, creation of a press plate may involve first precision grinding a stainless steel plate to ensure the flatness thereof. The plate is then engraved or otherwise etched to create a three-dimensional surface based on, for example, the digital data for the three-dimensional texture design. The etching of the press plate can be accomplished by any of a variety of etching techniques that will be apparent to a person skilled in the art. For example, the etching may involve chemical etching. In some instances, etching will also require printing an image of the texture design onto the steel plate to guide the etching process. Such printing may be based on the digital data for the three-dimensional texture design. Chemical etching and other processes for etching three-dimensional patterns into metallic plates are generally well-known in the art.

It should be appreciated that, although the written description and the figures of the present application describe the steps of an exemplary press plate design procedure in a particular order, a person having ordinary skill in the art will understand, in view of this disclosure, that, in other embodiments, the procedure may be practiced with some variations in the order of steps and that some of the steps may be combined with other steps.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A method of creating a press plate, the method comprising:
   providing a three-dimensional surface design for the press plate;
   providing a sample decorative layer comprising a decorative design printed thereon;
   providing a transparent overlay having a two-dimensional representation of the three-dimensional surface design printed thereon;
   positioning the transparent overlay with the two-dimensional representation of the three-dimensional surface design printed thereon over the sample decorative layer to view the three-dimensional surface design in relation to the decorative design;
   approving a particular three-dimensional surface design for the press plate based at least partially on the positioning the transparent overlay over the sample decorative layer; and
   creating the press plate based on the particular three-dimensional surface design.

2. The method of claim 1, wherein providing a transparent overlay having a two-dimensional representation of the three-dimensional surface design printed thereon comprises:
   printing the two-dimensional representation of the three-dimensional surface design onto the transparent overlay.

3. The method of claim 1, wherein providing a three-dimensional surface design for the press plate comprises:
   creating a three-dimensional surface design digitally based on a digital image of the decorative design.

4. The method of claim 1, wherein providing a sample decorative layer comprises:
   providing a sample decorative laminate comprising the sample decorative layer laminated therein.

5. The method of claim 4, wherein providing a sample decorative laminate comprises:
   manufacturing a sample decorative laminate using substantially the same materials and procedures that will be used to create a final decorative laminate.

6. The method of claim 4, further comprising:
   measuring differences between the decorative design on the sample decorative laminate and a copy of the decorative design that has not undergone a laminating procedure.

7. The method of claim 6, further comprising:
   revising the three-dimensional surface design based on the measured differences between the decorative design on the sample decorative laminate and a copy of the decorative design that has not undergone a laminating procedure, wherein the two-dimensional representation is a representation of the three-dimensional surface design after being revised based on the measured differences.

8. The method of claim 1, further comprising:
   providing a digital image of the decorative design; and
   obtaining measurements of the differences between the digital image of the decorative design and the decorative design printed on the sample decorative layer.

9. The method of claim 8, further comprising:
   using the measurements to adjust the three-dimensional surface design for the press plate.

10. The method of claim 1, further comprising:
    determining how much the press plate will expand during a laminating process; and
    scaling the three-dimensional surface design for the press plate based on how much the press plate will expand during the laminating process.

11. The method of claim 1, wherein positioning the transparent overlay with the two-dimensional representation of the three-dimensional surface design printed thereon over the sample decorative layer further comprises:
    aligning registration marks printed on the transparent overlay with registration marks printed on the sample decorative layer.

12. The method of claim 1, wherein the transparent overlay comprises an acetate sheet, and wherein the sample decorative layer comprises a paper sheet.

13. The method of claim 1, wherein the decorative design comprises an image of a wood, ceramic, tile, stone, or brick surface, and wherein the three-dimensional surface design for the press plate is configured to create a texture indicative of the wood, ceramic, tile, stone, or brick surface in the surface of a laminate created using the press plate.

14. The method of claim 1, further comprising:
    before the creating of the press plate, adjusting the three-dimensional surface design for the press plate based on the positioning of the transparent overlay over the sample decorative layer and a comparison, during the positioning, of the transparent overlay's two-dimensional representation of the three-dimensional surface design with the sample decorative layer's decorative design.

15. The method of claim 1, further comprising:
    using the press plate to create a decorative laminate comprising the decorative design.

16. A method comprising:
    providing an image of a decorative design;
    providing a sample laminate comprising a decorative layer having the decorative design printed thereon;
    measuring variations between the image of the decorative design and the decorative design on the sample laminate;
    creating or adjusting a three-dimensional surface design for a press plate based upon the image of the decorative design and the measured variations between the image of the decorative design and the decorative design on the sample laminate;

providing a transparent overlay having a two-dimensional representation of the three-dimensional surface design printed thereon;

positioning the transparent overlay with the two-dimensional representation of the three-dimensional surface design printed thereon over the sample laminate to view the two-dimensional representation of the three-dimensional surface design in relation to the sample laminate's decorative design; and creating the press plate where the three-dimensional surface of the press plate is created based on the three-dimensional surface design and is smaller than the two-dimensional representation of the three-dimensional surface design printed on the transparent overlay to account for growth that the press plate will undergo when subject to heat during a laminating procedure.

* * * * *